United States Patent [19]

Hong

[11] Patent Number: 5,783,886
[45] Date of Patent: Jul. 21, 1998

[54] SPINDLE MOTOR HAVING MAGNETIC BEARING

[75] Inventor: Weon Ki Hong, Kyunggi-Do, Rep. of Korea

[73] Assignee: Samsung Electro-Mechanics Co., Ltd., Suwon, Rep. of Korea

[21] Appl. No.: 692,776

[22] Filed: Aug. 6, 1996

[51] Int. Cl.$^6$ .................................................. H02K 7/09
[52] U.S. Cl. ................................................... 310/90.5
[58] Field of Search ........................... 310/90, 90.5, 67 R, 310/156

[56] References Cited

U.S. PATENT DOCUMENTS

| | | | |
|---|---|---|---|
| 3,614,181 | 10/1971 | Meeks | 310/90.5 |
| 4,379,598 | 4/1983 | Goldowsky | 310/90.5 |
| 4,451,811 | 5/1984 | Hoffman | 335/302 |
| 4,999,533 | 3/1991 | King et al. | 310/90 |
| 5,089,732 | 2/1992 | Konno et al. | 310/67 R |
| 5,140,208 | 8/1992 | Tozoni | 310/90.5 |
| 5,321,329 | 6/1994 | Horvorka | 310/90.5 |
| 5,559,382 | 9/1996 | Oku et al. | 310/90 |
| 5,574,322 | 11/1996 | Nii et al. | 310/90.5 |

*Primary Examiner*—Thomas M. Dougherty
*Assistant Examiner*—Judson H. Jones
*Attorney, Agent, or Firm*—Ladas & Parry

[57] ABSTRACT

The invention relates to a structure of a spindle motor. The spindle motor comprises a housing assembly having a cylindrical hub and a stator secured onto a circumferential outer surface of the cylindrical hub, a spindle hub having a rotor magnet secured onto a circumferential inner surface thereof, a rotating shaft passing through the spindle hub and extending into space defined in the cylindrical hub, a plurality of first permanent magnets fitted onto a circumferential outer surface of the rotating shaft and having opposed magnetic polarities in upper and lower direction, and a plurality of second permanent magnets fitted onto a circumferential inner surface of the cylindrical hub and having opposed magnetic polarities in upper and lower direction, whereby the rotating shaft can be rotated without any frictional contact, in a state being floated by magnetic repulsion and attraction induced by the first and second permanent magnets.

7 Claims, 5 Drawing Sheets

SPINDLE MOTOR HAVING MAGNETIC BEARING

BACKGROUND OF THE INVENTION

1. Field of the Invention

The present invention relates to a spindle motor used in a magnetic recorder/reproducer such as a hard disk drive (HDD) and the like, and more particularly to a spindle motor which has a magnetic bearing.

2. Description of the Prior Art

Generally, in a spindle motor used in a magnetic recorder/reproducer such as a hard disk drive (HDD), a ball bearing type spindle motor as shown in FIG. 1 is broadly utilized in the art. Also, more recently, a hydrodynamic bearing type spindle motor as shown in FIG. 2, which uses oil or air as a working fluid, has been developed and vigorously utilized. However, these bearings have some disadvantages as discussed below.

First, the ball bearing type spindle motor as shown in FIG. 1, which uses a pair of ball bearings a disposed adjacent to upper and lower ends of a rotating shaft b, respectively, suffers from drawbacks in that accuracy of revolution varies with every change of precision of a ball, noises and vibrations are created, a seal or other leakage-proof structure is needed for preventing particles of lubricant (grease) from being dispersed and deteriorating a hard disk drive, high-speed revolution is limited to a certain level, life span is shortened, and it has low anti-shock properties.

Second, in a hydrodynamic bearing type spindle motor as shown in FIG. 2, a void is formed between a rotating shaft b and a cylindrical hub d, and mating surfaces of the rotating shaft b and the cylindrical hub d are formed with grooves or oblique depressions to generate dynamic pressure by using oil or air as a working fluid, thereby to define a hydrodynamic bearing c. The hydrodynamic bearing type spindle motor still suffers from drawbacks in that a leakage-proof structure is needed, noises are created due to metal contacts, friction is severely generated, low-speed rotation becomes unstable, and thermal properties are not uniformly distributed.

In addition, the above described bearings of the prior art are difficult and expensive to manufacture.

SUMMARY OF THE INVENTION

Accordingly, the present invention has been made in an effort to solve the problems occurring in the prior art, and an object of the present invention is to provide a spindle motor having a magnetic bearing, in which permanent magnets having magnetism are disposed between a rotating shaft and a cylindrical hub for producing magnetic repulsion of same magnetic poles and magnetic attraction of different magnetic poles, thereby the rotating shaft can be rotated without any frictional contacts.

According to one aspect of the present invention, there is provided a spindle motor comprising: a housing assembly having a cylindrical hub and a stator secured onto a circumferential outer surface of the cylindrical hub; a spindle hub having a rotor magnet secured onto a circumferential inner surface thereof; a rotating shaft passing through the spindle hub and extending into space defined in the cylindrical hub; a plurality of first permanent magnets fitted onto a circumferential outer surface of the rotating shaft and having opposed magnetic polarities in an upper and lower direction; and a plurality of second permanent magnets fitted onto a circumferential inner surface of the cylindrical hub and having opposed magnetic polarities in an upper and lower direction; whereby the rotating shaft can be rotated without any frictional contact, in a state being floated by magnetic repulsion and attraction induced by the first and second permanent magnets.

According to another aspect of the present invention, the first magnet and the second magnet which are mated with each other have an identical polarity.

According to another aspect of the present invention, the magnetic center of the first upper permanent magnet is lower than that of the second upper permanent magnet and the magnetic center of the first lower permanent magnet is higher than that of the second lower permanent magnet, and undergo magnetic repulsion and attraction directed toward the boundary area between the upper and lower permanent magnets.

According to another aspect of the present invention, a circumferential groove is formed in the boundary portion between the second upper and lower magnets, to increase magnetic force by the Coriolis Effect.

According to another aspect of the present invention, a metal plate made from non-magnetic substance is attached to the circumferential inner surfaces of the second permanent magnets, to control magnetic force applied to the first permanent magnets.

According to another aspect of the present invention, a circumferential groove is formed in circumferential inner surface of the metal plate, to increase magnetic force by Coriolis Effect.

According to another aspect of the present invention, rotating shaft portions are integrally formed in the upper and lower ends of the first permanent magnets, respectively, to allow the first permanent magnets to take the function of rotating shaft.

According to another aspect of the present invention, the cylindrical hub is omitted and the second permanent magnets take the function of the cylindrical hub, and the stator is secured to the circumferential outer surface of the second permanent magnets.

According to still another aspect of the present invention, a magnetic force shutting plate is attached to axial inner surface of the spindle hub to prevent magnetic force emitted from the first and second permanent magnets from being transferred outward.

By the features of the present invention, any frictional contacts between a rotating shaft and a portion of a housing assembly can not be effected all the time while being rotated and being stopped, a uniform revolution can be obtained in both high and low speeds, property variation due to temperature change is minimized, and asymmetric revolution vibration becomes very small. Particularly, permanent magnets can be manufactured from various materials such as metal, plastic, rubber, etc., and rigidity, length and distance can be properly adjusted to control output of the motor.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Hereinafter, spindle motors in accordance with preferred embodiments of the present invention will be described in greater detail with reference to the drawings.

Figure 1:
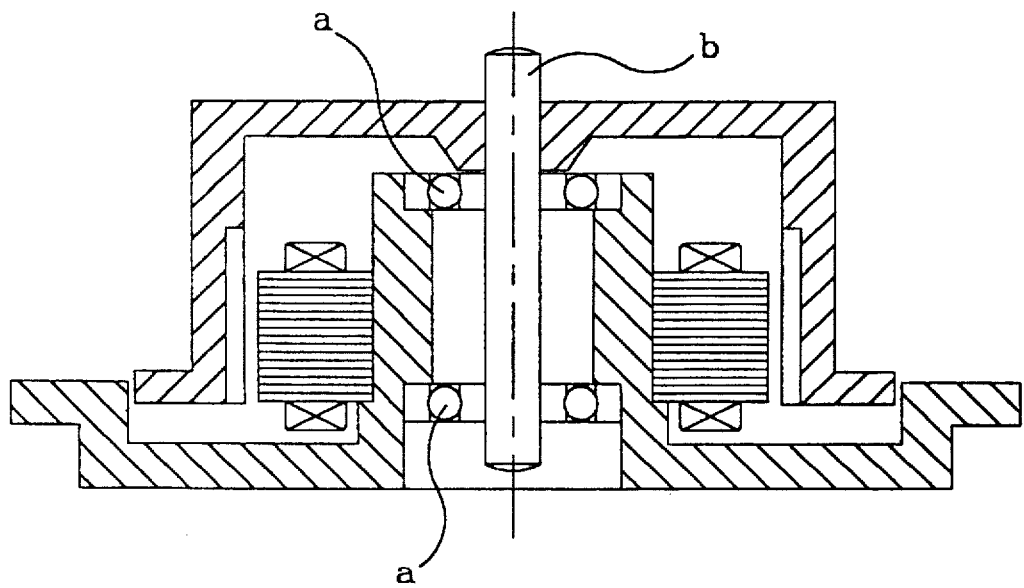
FIG. 1 is a cross-sectional view of a conventional spindle motor having a ball bearing.
Figure 2:
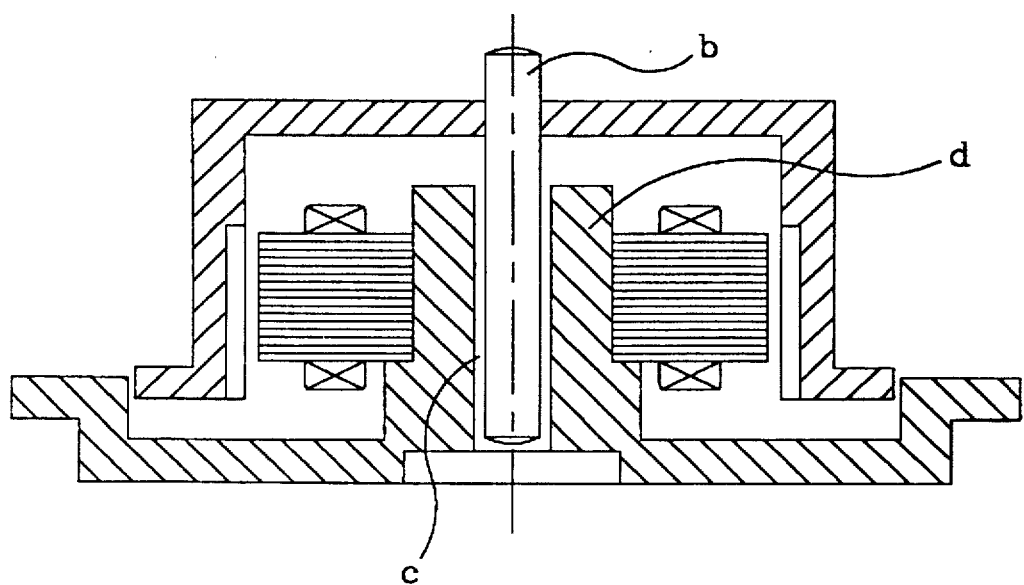
FIG. 2 is a cross-sectional view of another conventional spindle motor having a hydrodynamic bearing.
Figure 3:
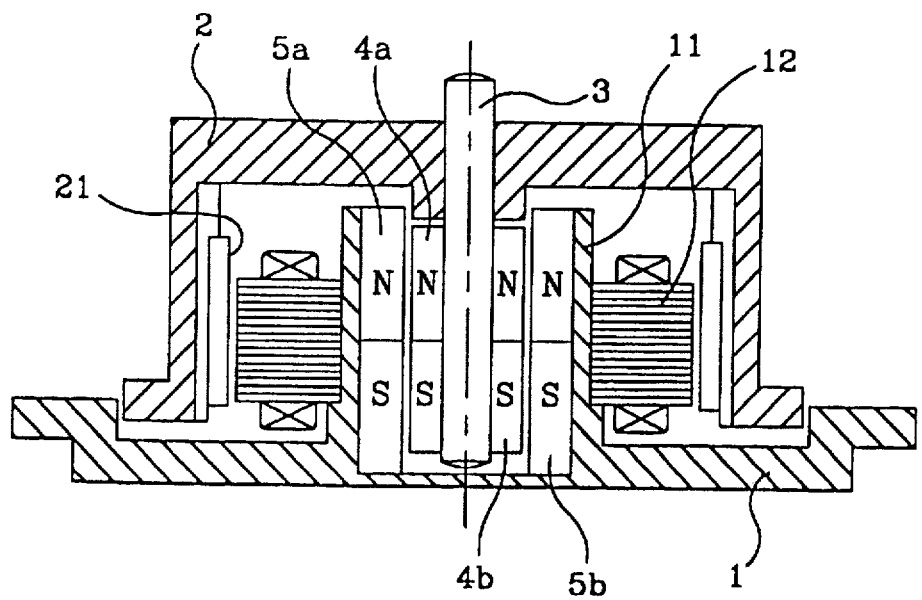
FIG. 3 is a cross-sectional view of a spindle motor in accordance with an embodiment of the present invention.
Figure 4A:
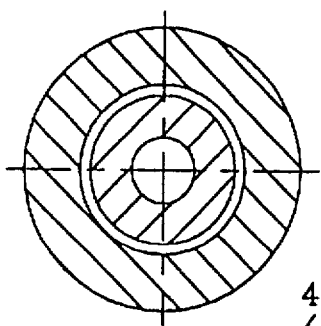
FIG. 4a is a transverse cross-sectional view through the spindle motor of FIG. 3.
Figure 4B:
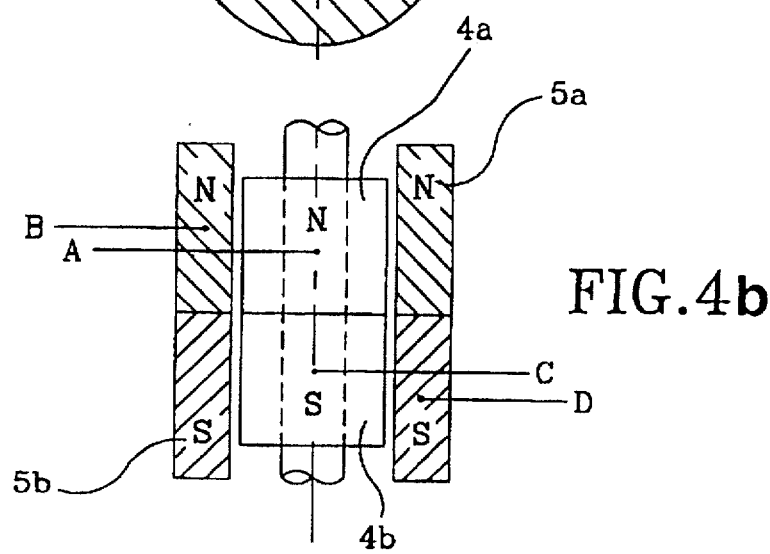
FIG. 4b is an enlarged view of the magnetic bearing of the spindle motor.

Referring to FIGS. 3, 4a and 4b a spindle motor according to a first embodiment of the present invention includes a housing assembly 1, a spindle hub 2 and a rotating shaft 3. A cylindrical hub 11 is formed a center portion of the housing assembly 1, and a stator 12 is secured to a circumferential outer surface of the cylindrical hub 11. The spindle hub 2 is provided on the housing assembly 1, and a rotor magnet 21 is secured to the circumferential inner surface of the spindle hub 2. The rotating shaft 3 is passed through the spindle hub 2 and is inserted into a space defined in the cylindrical hub 11.

In the cylindrical hub 11, a pair of first permanent magnets 4a and 4b are closely fitted onto a circumferential outer surface of the rotating shaft 3 to extend around the rotating shaft 3. The first permanent magnets 4a and 4b have opposed magnetic polarities, and, in the preferred embodiments of the present invention, are arranged in such a manner that the upper permanent magnet 4a has N polarity and the lower permanent magnet 4b has S polarity.

A pair of second permanent magnets 5a and 5b are closely fitted onto a circumferential inner surface of the cylindrical hub 11. The second permanent magnets 5a and 5b also have opposed magnetic polarities, and, in the preferred embodiments of the present invention, are arranged in such a manner that the upper permanent magnet 5a has N polarity and the lower permanent magnet 5b has S polarity, as in the first permanent magnets 4a and 4b.

Accordingly, as shown in FIG. 3, the rotating shaft 3 and the spindle hub 2 can be rotated in a state that the first permanent magnets 4a and 4b are not contacted with the second permanent magnets 5a and 5b, due to parallel magnetic repulsion induced by the upper magnets 4a and 5a all having N polarities and the lower magnets 4b and 5b all having S polarities. Also, as best shown in FIG. 4, magnetic center A of the first upper permanent magnet 4a fitted onto the rotating shaft 3 is positioned lower than that B of the second upper permanent magnet 5a fitted onto the cylindrical hub 11, to undergo downward acting magnetic repulsion and attraction; and magnetic center C of the first lower permanent magnet 4b fitted onto the rotating shaft 3 is higher than that D of the second lower permanent magnet 5b fitted onto the cylindrical hub 11, to undergo upward acting magnetic repulsion and attraction.

Therefore, the rotating shaft 3 having the first permanent magnets 4a and 4b fitted thereon is floated a space within the cylindrical hub 11 having the second permanent magnets 5a and 5b fitted thereon, in a uniformly balanced state. The balanced state of the rotating shaft 3 is maintained all the time while the rotating shaft 3 is rotated. Furthermore, it to be readily understood that output of the spindle motor can be properly adjusted by varying magnetic force of the permanent magnets 4a, 4b and 5a, 5b.

The present invention can be embodied otherwise, as shown in FIGS. 5 through 10.

Figure 5:
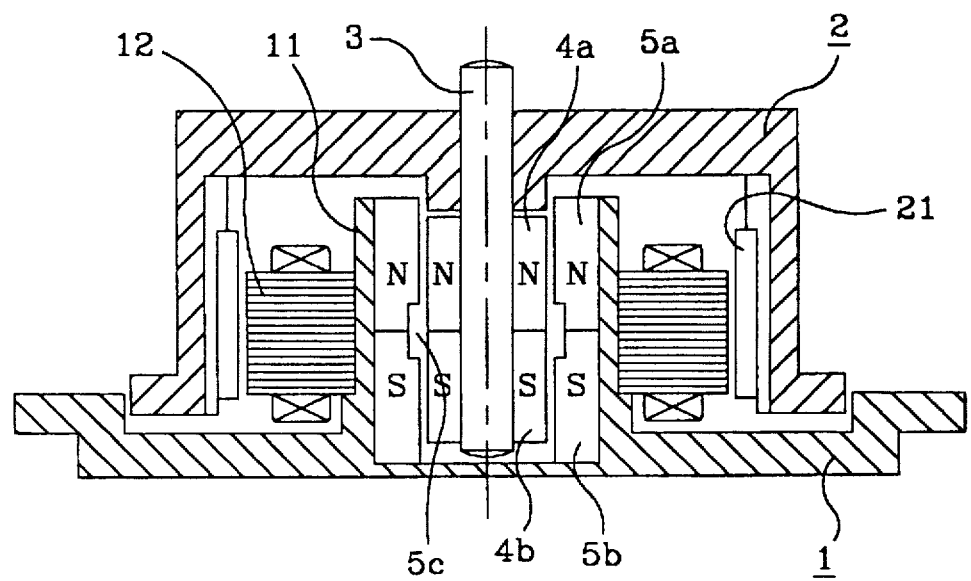
FIGS. 5 through 10 are cross-sectional views of other spindle motors in accordance with other embodiments of the present invention.

Referring now to FIG. 5, a circumferential groove 5c is formed in the boundary portion between the second upper and lower magnets 5a and 5b, to increase the distance from the opposed first upper and lower magnets 4a and 4b. By this, since magnetic force of the first and second upper and lower permanent magnets 4a, 4b and 5a, 5b is increased by the Coriolis Effect, it is possible to strengthen magnetic repulsion which is induced by effective magnetic force.

Figure 6:
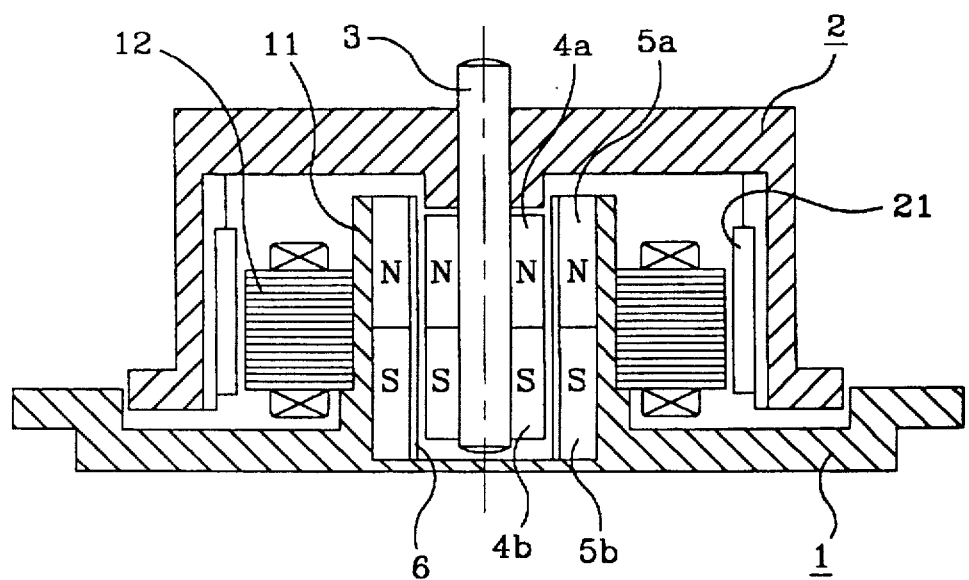

Referring to FIG. 6, a metal plate 6 made from non-magnetic substance is attached to inner surfaces of the second permanent magnets 5a and 5b, to control magnetic force applied to the first permanent magnets 4a and 4b.

Figure 7:
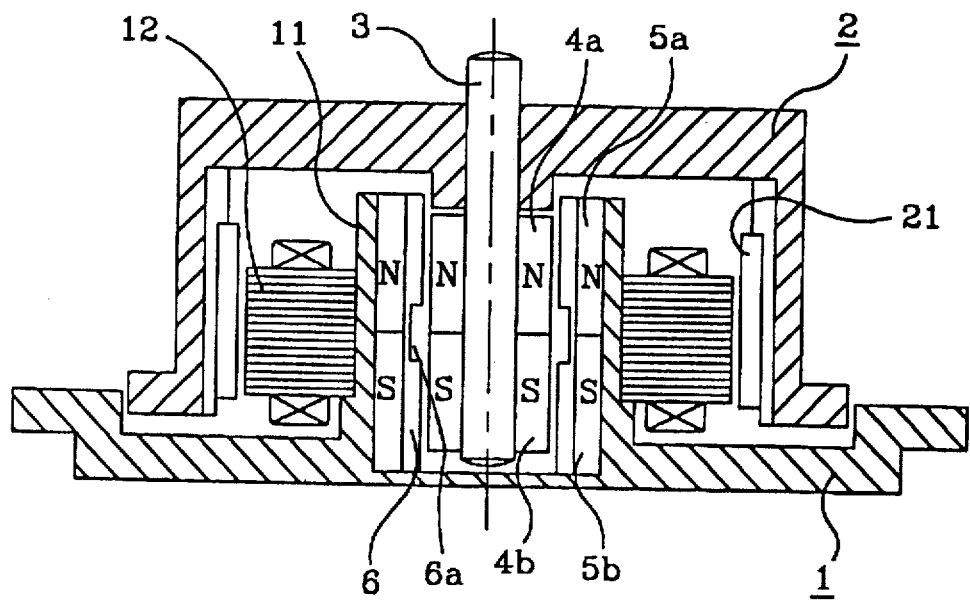

Referring to FIG. 7, a metal plate 6 made from non-magnetic substance is attached to inner surfaces of the second permanent magnets 5a and 5b as in FIG. 6, and, at the same time, a circumferential groove 6a is formed in the metal plate 6 at the boundary portion between the second upper and lower magnets 5a and 5b as in FIG. 5, to increase magnetic force by the Coriolis Effect and to control the magnetic force.

Figure 8:
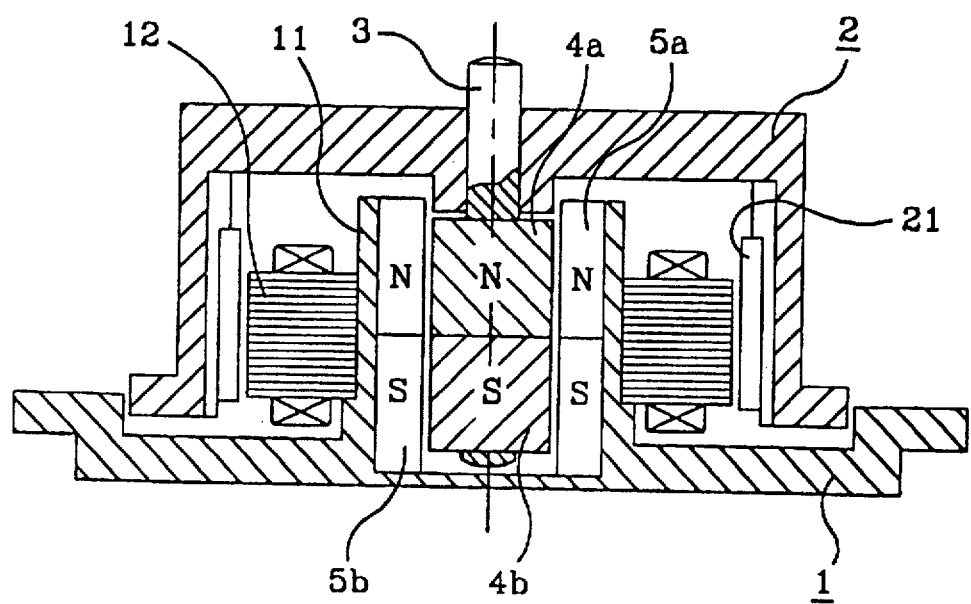

Referring to FIG. 8, rather than closely fitting the first permanent magnets 4a and 4b onto the circumferential outer surface of a rotating shaft, the rotating shafts are integrally formed with the upper and lower ends of the first permanent magnets 4a and 4b, respectively, to allow the first permanent magnets 4a and 4b to assume the function of the rotating shaft, thereby diameter can be decreased and a compact design can be realized.

Figure 9:
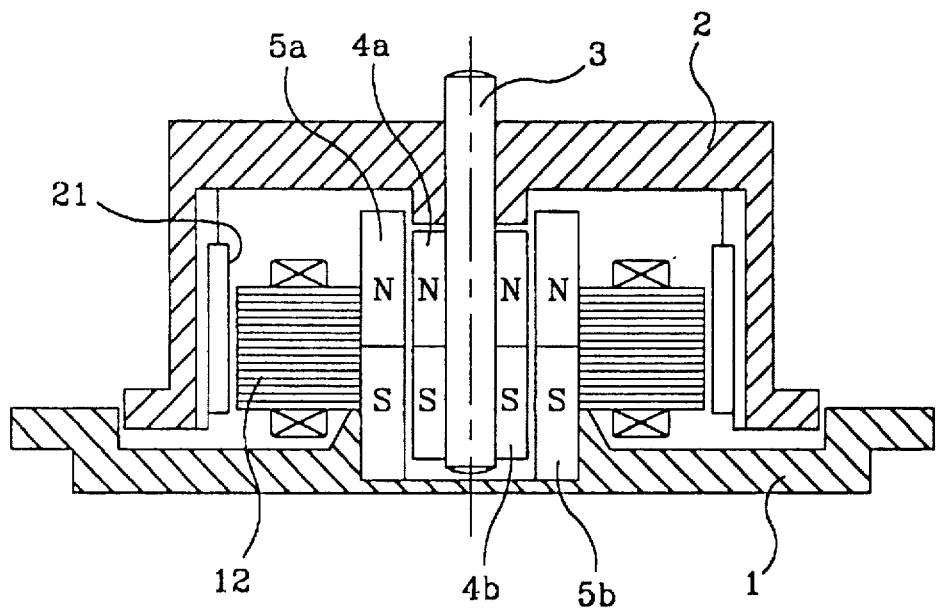

Referring to FIG. 9, rather than closely fitting the second permanent magnets 5a and 5b onto the circumferential inner surface of a cylindrical hub, the cylindrical hub is omitted and the second permanent magnets 5a and 5b assume the function of the cylindrical hub, thanks to which the stator 12 can be secured to the circumferential outer surface of the second permanent magnets 5a and 5b, to allow a decrease in diameter and to realize a compact design.

Figure 10:
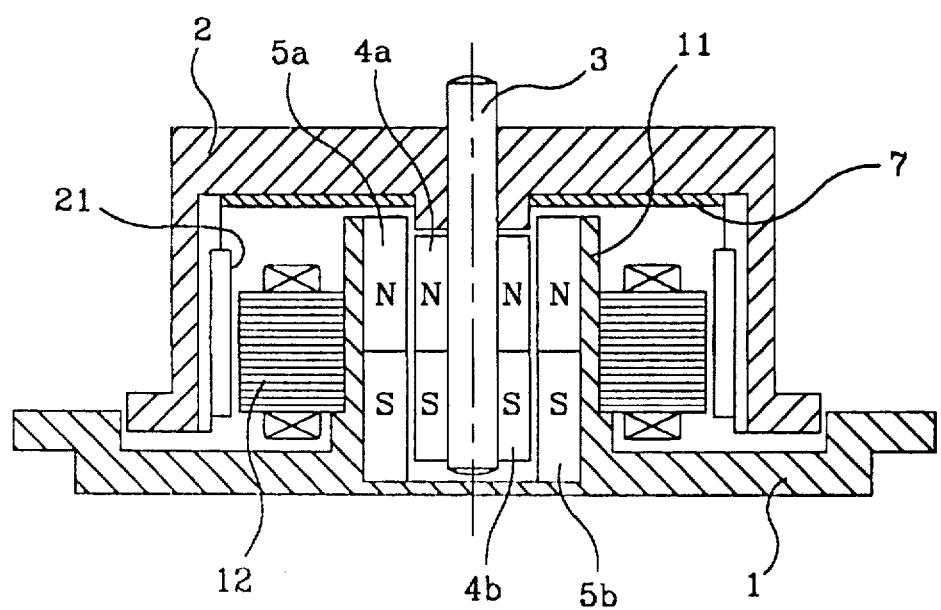

Referring to FIG. 10, a magnetic force shutting plate 7 made from iron is attached to an axial inner surface of the spindle hub 2 to prevent magnetic force emitted from the first and second permanent magnets 4a, 4b and 5a, 5b from affecting other portions of a hard disk drive.

As a result, the spindle motor according to the present invention, constructed as mentioned above, provides advantages in that since the first permanent magnets 4a and 4b fitted onto the rotating shaft 3 and the second permanent magnet 5a and 5b fitted onto the cylindrical hub 11 take the place of bearings of the prior art, any frictional contacts between a rotating shaft and a portion of a housing assembly cannot be effected all the time while being rotated and being stopped, a uniform rotation can be obtained in both high and low speeds, property variation due to temperature change is minimized, and asymmetric rotation vibration becomes very small. Particularly, permanent magnets can be manufactured from various materials such as metal, plastic, rubber, etc., and rigidity, length and distance can be properly adjusted to control output of the motor.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A spindle motor comprising:

a housing assembly having a cylindrical hub and a stator secured onto a circumferential outer surface of the cylindrical hub; means for energizing said stator;

a spindle hub having a rotor magnet secured onto a circumferential inner surface thereof in facing relation to said stator;

a rotatable shaft secured to and passing through the spindle hub into a space defined in the cylindrical hub;

a plurality of first permanent magnets fitted onto a circumferential outer surface of the rotatable shaft and having opposite magnetic polarities in upper and lower portions thereof, and a plurality of second permanent magnets fitted onto a circumferential inner surface of the cylindrical hub and having opposite magnetic polarities in upper and lower portions thereof;

said first and second magnets facing one another whereby the rotatable shaft can be rotated without any frictional contact, in a floating state, by magnetic forces produced by the first and second permanent magnets, a magnetic center of the upper portion of the first permanent magnet being lower than a magnetic center of the upper portion of the second permanent magnet and a magnetic center of the lower portion of the first permanent magnet being higher than a magnetic center of the lower portion of the first permanent magnet, to produce magnetic forces directed radially and axially between said first and second magnets, said forces which are directed axially in said upper and lower portions of the first and second magnets acting in opposite directions towards a common boundary area between said upper and lower portions of said first and second permanent magnets.

2. A spindle motor as claimed in claim 1, wherein the first and second portions of the first and second magnets are respectively opposite one another and have the same polarities so that said magnetic forces are repulsion forces.

3. A spindle motor as claimed in claim 2, wherein said upper and lower portions of said second permanent magnets extend axially with respect to said shaft beyond said upper and lower portions of said first permanent magnets respectively.

4. A spindle motor as claimed in claim 3, wherein said second permanent magnets are integral with said housing assembly and constitute said cylindrical hub, said stator being mounted on said second permanent magnets.

5. A spindle motor as claimed in claim 2, comprising a metal plate of non-magnetic material attached to a circumferential inner surface of said second permanent magnets to face said first permanent magnets.

6. A spindle motor as claimed in claim 2, wherein said common boundary area of said upper and lower portions of said first and second magnets is a horizontal plane, said upper and lower portions of said first magnet being shorter in axial length, along said shaft from said horizontal plane, than said upper and lower portions of said second magnets.

7. A spindle motor as claimed in claim 6, wherein said upper and lower portions of said first magnets are shorter in said axial length than the upper and lower portions of said second magnets by equal amounts.

* * * * *